US009720162B2

(12) United States Patent
Hatta et al.

(10) Patent No.: US 9,720,162 B2
(45) Date of Patent: Aug. 1, 2017

(54) OPTICAL SHEETS FORMED WITH TWO-PART PROTRUSIONS ON ITS EDGES

(71) Applicant: Sharp Kabushiki Kaisha, Osaka (JP)

(72) Inventors: Kazuya Hatta, Yonago (JP); Shuhei Sota, Yonago (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 211 days.

(21) Appl. No.: 14/354,427

(22) PCT Filed: Oct. 22, 2012

(86) PCT No.: PCT/JP2012/077177
§ 371 (c)(1),
(2) Date: Apr. 25, 2014

(87) PCT Pub. No.: WO2013/061897
PCT Pub. Date: May 2, 2013

(65) Prior Publication Data
US 2014/0268868 A1  Sep. 18, 2014

(30) Foreign Application Priority Data
Oct. 28, 2011  (JP) ................. 2011-237000

(51) Int. Cl.
G02F 1/00 (2006.01)
F21V 8/00 (2006.01)
G02F 1/1335 (2006.01)

(52) U.S. Cl.
CPC ....... *G02B 6/005* (2013.01); *G02F 1/133606* (2013.01); *G02F 1/133608* (2013.01); *G02F 2201/46* (2013.01)

(58) Field of Classification Search
CPC ..... G02B 6/005; G02B 6/0086; G02B 6/0088
USPC ................ 362/600, 606–107, 612, 632–633
See application file for complete search history.

(56) References Cited

U.S. PATENT DOCUMENTS 7,578,609 B2 * 8/2009 Chang ............... G02F 1/133608
362/618
2008/0316772 A1 * 12/2008 Terada ................ B29C 45/0025
362/633
2010/0165234 A1 * 7/2010 Park ..................... G02B 6/0088
349/58

(Continued)

FOREIGN PATENT DOCUMENTS

JP  2007-18010 A  1/2007

*Primary Examiner* — Sean Gramling
*Assistant Examiner* — Gerald J Sufleta, II
(74) *Attorney, Agent, or Firm* — Chen Yoshimura LLP

(57) ABSTRACT

This backlight device 2 is provided with: a light source; a plurality of stacked optical sheets 22, 23, and 24 through which the light from the light source passes; and a frame member 28 to which the plurality of optical sheets 22, 23, and 24 are affixed. The respective plurality of optical sheets 22 to 24 is provided with protrusions 221, 231, and 241 that protrude in a direction parallel to the sheet surface at a portion of the edge thereof. The protrusions 221, 231, and 241 respectively have: first regions 221a, 231a, and 241a that are provided to the root side and that do not overlap the protrusions of the other optical sheets; and second regions 221b, 231b, and 241b that are provided to the tip side and of which at least a portion overlaps the protrusions of the other optical sheets.

8 Claims, 12 Drawing Sheets

(56) References Cited

U.S. PATENT DOCUMENTS

| | | | |
|---|---|---|---|
| 2010/0321604 A1* | 12/2010 | Choi | G02B 6/0088 349/58 |
| 2012/0002130 A1* | 1/2012 | Watanabe | G02B 6/0088 349/60 |
| 2012/0106197 A1* | 5/2012 | Lai | B32B 37/12 362/609 |
| 2012/0206680 A1* | 8/2012 | Onishi | G02F 1/134336 349/122 |
| 2013/0208508 A1* | 8/2013 | Nichol | G02B 6/0013 362/612 |

* cited by examiner

OPTICAL SHEETS FORMED WITH TWO-PART PROTRUSIONS ON ITS EDGES

TECHNICAL FIELD

The present invention relates to a backlight device used to illuminate a display panel from a rear surface thereof. Also, the present invention relates to a display device including the backlight device.

BACKGROUND ART

Conventionally, display devices having a liquid crystal panel as a display panel have included backlight devices that illuminate the display panel from the rear (refer to Patent Document 1, for example). FIG. 13 is a schematic perspective view showing a configuration example of a conventional backlight device 100. FIGS. 14A and 14B are schematic cross-sectional views of the backlight device shown in FIG. 13, FIG. 14A being a cross-sectional view along the line Z1-Z1, FIG. 14B being a cross-sectional view along the line Z2-Z2. The backlight device 100 shown in FIGS. 13, 14A and 14B is a so-called edge-lit (side-lit) backlight device.

As shown in FIGS. 13, 14A, and 14B, the conventional backlight device 100 includes a light source 101, a light guide plate 102, a plurality of sheets 103, a reflective sheet 104, a resin frame 105, a light-shielding tape 106, and a lamp cover 107. The light emitted by the light source 101 enters the light guide plate 102 from a side face thereof, and is emitted from the upper surface of the light guide plate 102 in a planar form. The plurality of sheets 103 include a diffusion sheet and a lens sheet, for example, and in this example, a diffusion sheet 103a is disposed at the very top. The diffusion sheet 103a evenly diffuses light emitted from the light guide plate 102 towards the display surface side.

In the conventional backlight device 100, the light-shielding tape 106 is bonded to the upper surface of the peripheral edge of the diffusion sheet 103a and the resin frame 105 so as to cover these, and thus, the diffusion sheet 103a and the resin frame 105 are fixed in place. According to this configuration, it is possible to prevent the occurrence of bright lines in the peripheral edge of the display region of the liquid crystal display element (not shown) on the upper side of the backlight device 100, and it is possible to prevent the sheets 103 from shifting in position.

However, the conventional backlight device 100 described above has the following problems. The sheets (optical sheets) 103 disposed over the light guide plate 102 expand due to temperature changes. Thus, if the peripheral edge of the optical sheets 103 is covered in a frame shape by the light-shielding tape 106, the optical sheets 103 are susceptible to warping due to temperature change. Display devices with a large display size are particularly susceptible to the negative effect of warping in the optical sheet.

RELATED ART DOCUMENT

Patent Document

Patent Document 1: Japanese Patent Application Laid-Open Publication No. 2007-18010

SUMMARY OF THE INVENTION

Problems to be Solved by the Invention

The applicants of the present invention sometimes provide protrusions 207 in portions of the periphery of the respective plurality of (stacked) optical sheets 203 included in the backlight device 200 as shown in FIGS. 15A and 15B, for example. These protrusions 207 are provided in order to prevent the optical sheets 203 from being disposed upside down and/or with errors in the alignment of the optical sheets 203, for example. FIGS. 15A and 15B are top views showing a configuration of a backlight device 200 previously developed by the applicants of the present invention; FIG. 15A shows a state prior to the light-shielding tape 206 being attached, and FIG. 15B shows a state after the light-shielding tape 206 has been attached. In FIGS. 15A and 15B, the reference character 201 refers to the light sources, 202 refers to the light guide plate, and 205 refers to the frame.

In this configuration, the light-shielding tape 206 is bonded so as to fix only the protrusions 207 of the optical sheets 203 to the frame 205. Thus, compared to the conventional backlight device 100 described above, in the backlight device 200 of this configuration, the occurrence of warping in the optical sheets 203 due to temperature change is mitigated.

However, it was found that the previously developed backlight device 200 has the following problems. These will be explained with reference to FIGS. 16, 17, and 18. FIG. 16 is a schematic plan view showing a configuration of a display device having a display panel 300 mounted on the backlight device 200 shown in FIG. 15B. In FIG. 16, the rectangular area within the broken line is the display area. FIG. 17 is a schematic cross-sectional view of FIG. 16 along the line A'-A'. FIG. 18 is a schematic cross-sectional view of FIG. 16 along the line B'-B'. At the line A'-A', a protrusion 207 (refer to FIG. 15B) is provided, and at the line B'-B', a protrusion 207 is not provided. The reference character 204 in FIGS. 17 and 18 refers to the reflective sheet.

As can be seen by the comparison between FIGS. 17 and 18, the path of the light outputted from the light guide plate 202 shows great variation in portions of the boundary vicinity, which is between the display area and the non-display area ("vicinity" being defined as the area that affects display), between where protrusions 207 are provided and portions where they are not provided. That is, in portions where the protrusions 207 are provided, light emitted from the light guide plate 202 passes through a plurality (three in the drawing) of optical sheets 203. Where the protrusions 207 are not provided, light emitted from the light guide plate 202 does not pass through any optical sheets 203.

As a result, in the display device using the previously developed backlight device 200, among the edge of the display area, portions in the broken line circle in FIG. 16 (vicinity of the portions where the protrusions 207 are provided) have areas that appear dark (dark areas).

In order for such dark areas not to be readily visible, possible solutions include removing the protrusions 207 or having the light-shielding tape 206 cover the base of the protrusions 207, for example. However, if such a configuration is used, the warping of the optical sheets resulting from temperature changes as described above, for example, occurs more easily, which is undesirable.

An object of the present invention, taking into account the above-mentioned problems, is to provide a backlight device that is not susceptible to uneven brightness in the outputted light. Another object of the present invention is to provide a display device that is not susceptible to uneven brightness on the display surface by providing such a backlight device.

Means for Solving the Problems

In order to attain the above-mentioned object, a backlight device of the present invention includes: a light source; a plurality of stacked optical sheets through which light from the light source passes; and a frame member that fixes the plurality of optical sheets in place, wherein each of the plurality of optical sheets is provided with a protrusion in a portion of an edge of each of the optical sheets, the protrusion protruding in a direction parallel to a surface of each of the optical sheets, wherein the protrusion provided in each of the plurality of optical sheets has: a first region that is directly connected to each of the optical sheets and that does not overlap a protrusion of another optical sheet; and a second region that is connected to each of the optical sheets through the first region and that overlaps a protrusion of another optical sheet at least in part, and wherein at least a portion of the first region is not mounted on the frame member, and at least a portion of the second region is mounted on the frame member (first configuration).

According to this configuration, the first regions of the protrusions do not overlap protrusions of other optical sheets. Thus, according to this configuration, light transmitted through the protrusions (portions of the optical sheets) and radiated outside can pass through only one optical sheet without passing through a plurality of optical sheets as in the above-mentioned previously developed backlight device. As a result, according to this configuration, it is possible to reduce the difference in light intensity between light radiated outside through gaps between the optical sheets and the frames and light radiated outside through the protrusions. That is, according to this configuration, it is possible to provide a backlight that is not susceptible to uneven brightness (bright and dark regions) of emitted light. Also, in this configuration, when assembling the device, it is possible to confirm with ease whether or not there are any missing optical sheets by observing the state of the protrusions.

In the backlight device of the first configuration, it is preferable that a light-shielding tape that fixes the protrusions to the frame member be further included, wherein the frame member has recesses in portions thereof where the protrusions are to be disposed such that the height of the light-shielding tape is the same in both portions where the protrusions are disposed and portions where the protrusions are not disposed (second configuration). In this configuration, the second regions of the protrusions (portions of the optical sheets) overlap the protrusions of the other optical sheets. Thus, the step provided in the frame member can be made the same height as the thickness of the plurality of stacked optical sheets, and thus, it is possible to have an even height for the light-shielding tape both in portions where the protrusions are disposed and portions where the protrusions are not disposed. By this configuration, no steps are formed in the light-shielding tape, and thus, it is possible to mitigate a decrease in bonding strength for the light-shielding tape.

In the backlight device of the first or second configuration, a plurality of the protrusions may be provided with a gap in a plan view between the adjacent first regions (third configuration). According to this configuration, it is possible to prevent adjacent first regions from overlapping regardless of machining tolerance or assembly tolerance of the optical sheets.

In the backlight device of the first to third configurations, among the plurality of protrusions, a protrusion may differ in amount of protrusion from the edge of the optical sheet compared to other protrusions (fourth configuration). In such a configuration, by devising a step configuration in the frame member on which a portion of the protrusion is mounted, it is possible to have a configuration in which the optical sheets are not susceptible to shifting in position or to warping regardless of positional adjustment or thermal expansion in the optical sheets.

In the backlight device of the first to fourth configurations, in all of the plurality of optical sheets, the protrusions may respectively have first belt-shaped portions that are the first regions, and second belt-shaped portions that are the second regions and that extend in a direction substantially perpendicular to the first belt-shaped portions.

Also, in the backlight device of the first to fourth configurations, the protrusions formed in the plurality of optical sheets may include: a first type having first belt-shaped portions that are the first regions and second belt-shaped portions that are the second regions and that extend in a direction substantially perpendicular to the first belt-shaped portions; and a second type each having two third belt-shaped portions that are disposed with a gap therebetween and that are the first regions, and a fourth belt-shaped portion that connects ends of the two third belt-shaped portions and that is the second region (sixth configuration).

In the backlight device of the first to sixth configurations, a light guide plate that receives the light emitted by the light source, and that outputs light towards the plurality of optical sheets may be further included (seventh configuration).

Also, in order to attain the above-mentioned object, a display device of the present invention includes: the backlight device of the first to seventh configurations; and a display panel illuminated by light from the backlight device (eighth configuration).

According to this configuration, uneven brightness in the light emitted from the backlight device is mitigated, and thus, a display device that is not susceptible to uneven brightness on the display surface can be provided.

In the eighth display device, it is preferable that a boundary between a display region and a non-display region in the display panel be positioned over the first regions of the protrusions.

Effects of the Invention

According to the present invention, it is possible to provide a backlight device that is not susceptible to uneven brightness in the outputted light. Also, according to the present invention, it is possible to provide a display device that is not susceptible to uneven brightness in the display surface.

DETAILED DESCRIPTION OF EMBODIMENTS

Embodiments of a backlight device and display device of the present invention will be described below with reference to drawings. The present invention can be applied to a wide variety of display devices including display panels and backlight devices, but an example will be described below of a case in which the present invention is applied to a liquid crystal display device in which the display panel is a liquid crystal panel.

Embodiment 1

Figure 1:
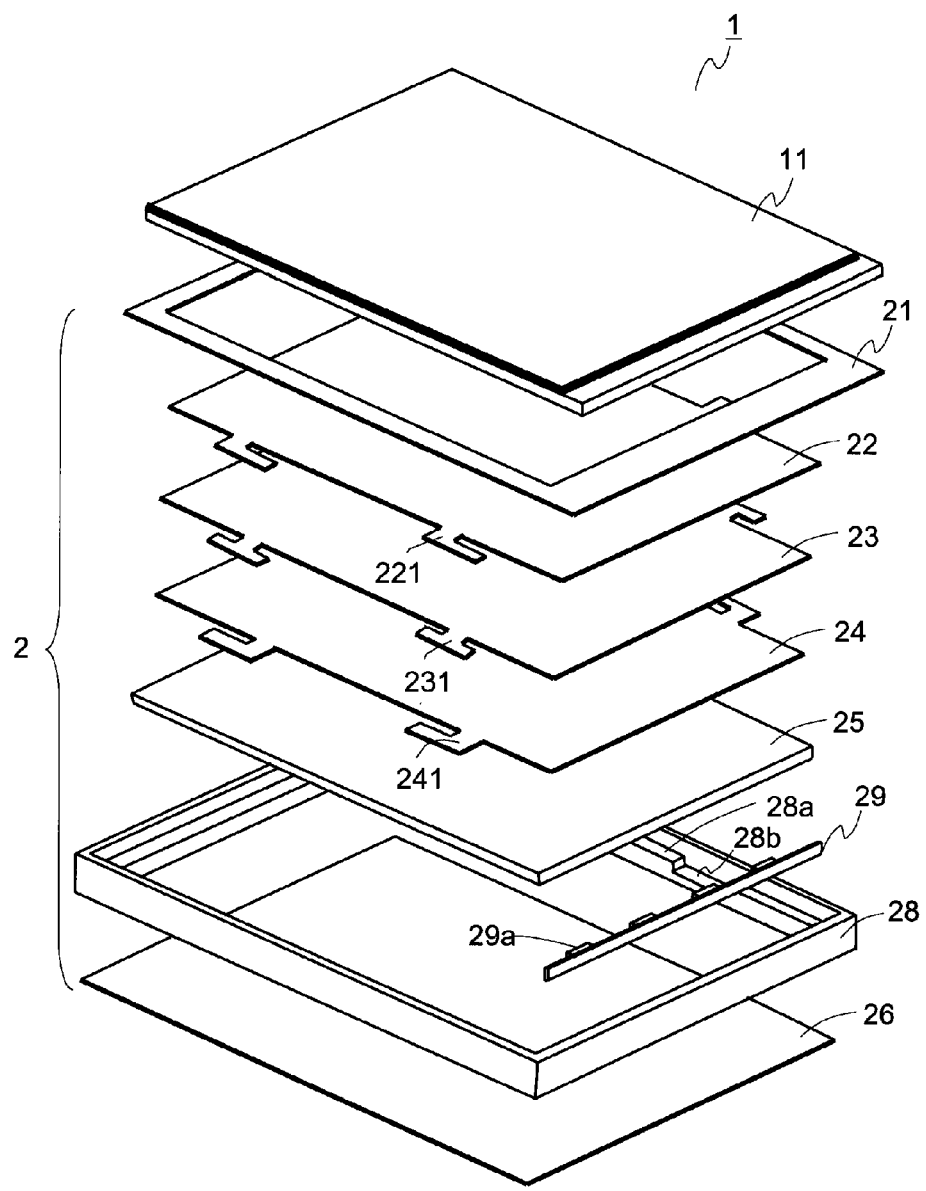
FIG. 1 is an exploded perspective view schematically showing a liquid crystal display device according to Embodiment 1 of the present invention.

FIG. 1 is an exploded perspective view that shows a schematic configuration of a liquid crystal display device 1 of Embodiment 1 of the present invention. As shown in FIG. 1, the liquid crystal display device 1 mainly includes a liquid crystal panel 11 (one example of a display panel of the present invention), and a backlight device 2 (one example of a backlight device of the present invention) that radiates light towards the liquid crystal panel 11 from the rear surface thereof. The liquid crystal panel 11 and the backlight device 2 may be configured so as to be sandwiched between a box-shaped lower cover and a frame-shaped upper cover (neither of which are shown), for example.

The liquid crystal panel 11 has a widely known configuration. To describe it simply, the liquid crystal panel 11 has a configuration in which liquid crystal is sealed between a pair of glass substrates that face each other with a gap therebetween. One of the glass substrates constituting the liquid crystal panel 11 has a plurality of switching elements such as TFTs (thin film transistors) and a plurality of pixel electrodes connected to these switching elements arranged in a matrix on the surface of the glass substrate. This glass substrate has a plurality of scan signal lines and data signal lines necessary to drive the plurality of switching elements arranged such that the lines intersect each other. The other glass substrate constituting the liquid crystal panel 11 has formed thereon an opposite electrode and color filters. The liquid crystal panel 11 has polarizing plates disposed on the upper surface and the lower surface thereof.

The backlight device 2 is of a so-called edge-lit type. The backlight device 2 has a configuration in which a light-shielding tape 21, an upper lens sheet 22, a lower lens sheet 23, a diffusion sheet 24, a light guide plate 25, and a reflective sheet 26 are stacked in that order from the top. The frame-shaped frame 28 is disposed so as to surround the light guide plate 25 that is a flat plate. The light source device 29 is disposed within the frame 28 such that light enters the light guide plate 25 from the side face thereof.

In the present embodiment, the light guide plate 25 has a flat plate shape, but the shape of the light guide plate 25 is not limited to a flat plate shape, and may instead be a different shape such as a wedge shape, for example. In the present embodiment, the light source device 29 includes a plurality of light emitting diodes (LEDs) 29a, but the light source device 29 is not limited to this configuration. For example, the light source device 29 may have a configuration of including cold cathode fluorescent lamps or the like.

In the backlight device 2, the light entering the light guide plate 25 from the light source device 29 it outputted from the upper surface of the light guide plate 25 in a planar form. A reflective sheet 26 is disposed on the lower surface of the light guide plate 25, and thus, light that would otherwise be outputted from the lower surface of the light guide plate 25 is reflected back by the reflective sheet 26.

A large portion of the light outputted from the upper surface of the light guide plate 25 passes through three optical sheets 22 to 24 (passing through the diffusion sheet 24, the lower lens sheet 23, and the upper lens sheet 22 in this order) and reaches the liquid crystal panel 11. The three optical sheets 22 to 24 are provided such that the liquid crystal panel 11 is illuminated with light outputted from the light guide plate 25 that is even, for example. In the present embodiment, three optical sheets are provided, but as long as there are a plurality of optical sheets, the number and type thereof may be appropriately modified. The three optical sheets 22 to 24 are an example of a plurality of optical sheets in the present invention.

The respective three optical sheets 22, 23, and 24 have protrusions 221, 231, and 241 (four positions per optical sheet in the present embodiment) in portions of the peripheries thereof. The rectangular optical sheets 22, 23, and 24 each have a total of four protrusions 221, 231, and 241, with each of the two parallel long sides having two protrusions. The respective protrusions 221, 231, and 241 are provided such that those on the same side have the same shape, and opposing two sides are formed so as to exhibit line symmetry.

The protruding directions of the protrusions 221, 231, and 241 are parallel to the main surface (sheet surface) of the optical sheets. Also, the respective protrusions 221, 231, and 241 are formed integrally with the optical sheets 22, 23, and 24. That is, the protrusions 221, 231, and 241 are portions of the optical sheets 22, 23, and 24. Such protrusions 221 to 241 are provided with the aim of preventing the optical sheets 22 to 24 from being misaligned or disposed upside down when assembling the backlight device 2, for example.

In the present embodiment, the protrusions 221, 231, and 241 provided in the respective optical sheets 22, 23, and 24 are provided on two opposing sides so as to exhibit line symmetry, but the configuration is not limited thereto, and the protrusions may be disposed so as exhibit asymmetry.

Figure 2A:
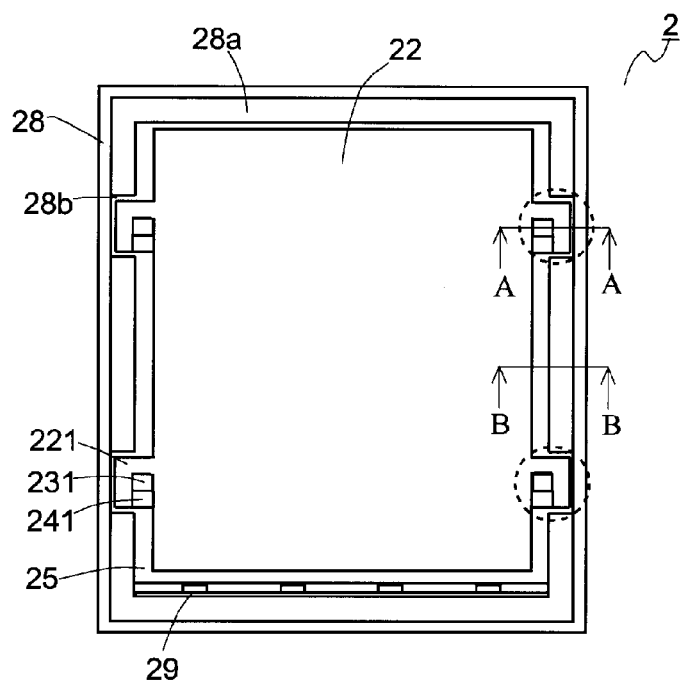
FIG. 2A is a schematic top view showing a configuration of a backlight device of Embodiment 1 in a situation in which the light-shielding tape has not been attached.
Figure 2B:
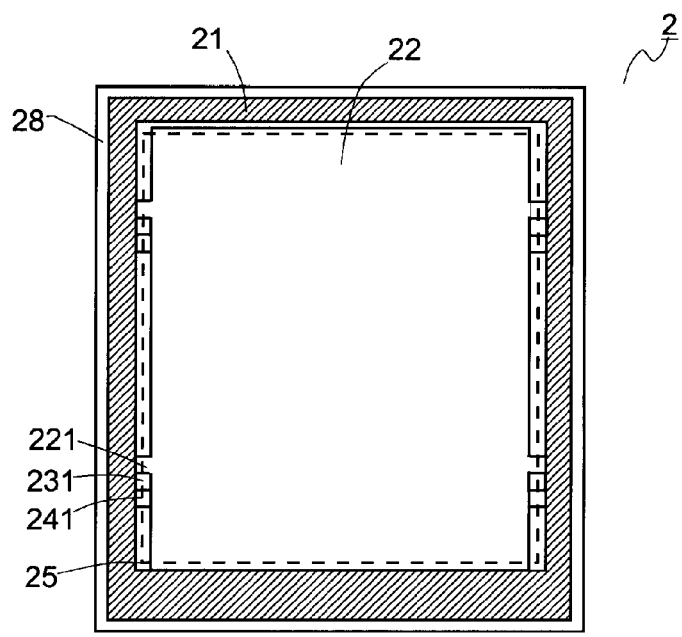
FIG. 2B is a schematic top view showing a configuration of a backlight device of Embodiment 1 in a situation in which the light-shielding tape has been attached.

FIGS. 2A and 2B are schematic top views showing a configuration of the backlight device 2 of Embodiment 1. FIG. 2A shows a state in which the light-shielding tape 21 has not been attached, and FIG. 2B shows a state in which the light-shielding tape 21 has been attached. The broken line forming a rectangle in FIG. 2B shows a boundary between a display area (display region) and a non-display area (non-display region) when the display panel 11 is mounted on the backlight device 2. The area within the rectangular broken line is the display area and the area outside the broken line is the non-display area.

As can be seen from FIGS. 1, 2A and 2B, the frame 28 (an example of a frame member of the present invention) has formed thereon a frame-shaped first mounting surface 28a where the frame-shaped light-shielding tape 21 is to be attached. Also, the frame 28 has second mounting surfaces 28b that are provided so as to be lower in height than the first mounting surface 28a and such that some of the protrusions 221, 231, and 241 are mounted on each of the mounting surfaces 28b. In other words, the frame 28 has a step shape. The step between the first mounting surface 28a and the second mounting surfaces 28b is almost the same height has three stacked optical sheets 22 to 24. Details will be clarified later, but by mounting (attached) the light-shielding tape 21 onto the first mounting surface 28a, portions of the light-shielding tape 21 and the protrusions 221 of the upper lens sheet 22 are bonded together, which causes the optical sheets 22 to 24 to be fixed to the frame 28.

Figure 3:
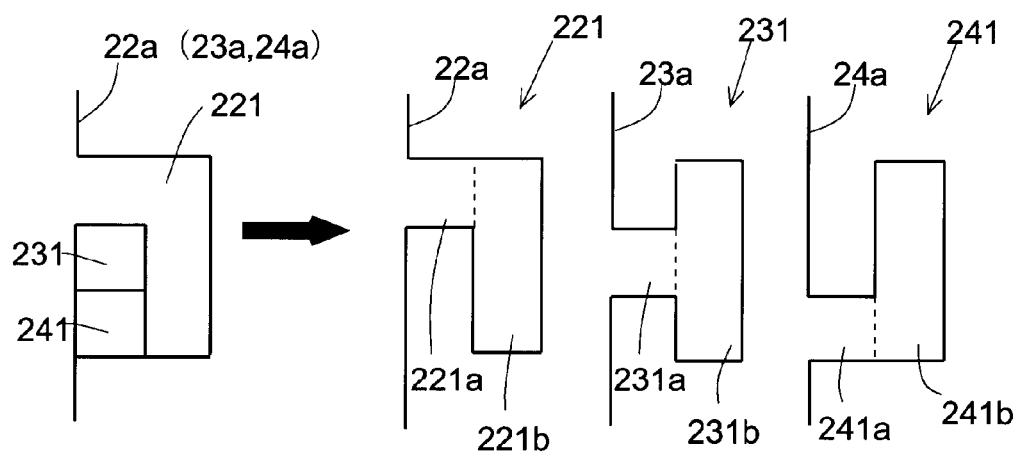
FIG. 3 is a schematic plan view for describing a configuration of protrusions included in the backlight device of Embodiment 1.

FIG. 3 is a schematic plan view for describing the configuration of the protrusions 221, 231, and 241 included in the backlight device 2 of Embodiment 1. FIG. 3 is a drawing for describing the configurations of the protrusions 221, 231, and 241 that are surrounded by the broken line circles in FIG. 2A. As described above, the protrusions 221, 231, and 241 are formed on sides opposite to where the broken line circles in FIG. 2A are, but the configuration of these protrusions provided on the opposite side are similar to the protrusions surrounded by the broken line circles except that they face the opposite direction. Thus, to avoid redundant description, only the configuration of the protrusions on one side will be described.

In FIG. 3, the left side of the thick arrow shows a state in which the three optical sheets 22 to 24 are disposed in a prescribed position in the frame 28 (same as the state shown in FIG. 2A). Also, in FIG. 3, the right side of the thick arrow shows a state in which the protrusions 221, 231, and 241 of the three optical sheets 22 to 24 do not overlap. The right-side drawing is to clarify the difference in configuration of the protrusions 221, 231, and 241 formed in the optical sheets 22, 23, and 24.

The respective protrusions 221, 231, and 241 all have: first belt-shaped portions 221a, 231a, and 241a that are provided towards the bases thereof and that extend in a direction that is substantially perpendicular to long sides 22a, 23a, and 24a of the respective optical sheets 22, 23, and 24; and second belt-shaped portions 221b, 231b, and 241b that are provided at the tips thereof and that extend in a direction that is substantially perpendicular to the first belt-shaped portions 221a, 231a, and 241a. However, the three protrusions 221, 231, and 241 differ in shape from each other. The regions constituted of the first belt-shaped portions 221a, 231a, and 241a correspond to first regions of the present invention, and the regions constituted of the first belt-shaped portions are sometimes referred to below as the first regions. The regions constituted of the second belt-shaped portions 221b, 231b, and 241b correspond to second regions of the present invention, and the regions constituted of the second belt-shaped portions are sometimes referred to below as the second regions.

The second regions 221b, 231b, and 241b of the respective protrusions 221, 231, and 241 have the same shape (same size), and when the three optical sheets 22 to 24 are stacked in a prescribed location on the frame 28, all of the second regions 221b, 231b, and 241b correspond in position. However, in the respective protrusions 221, 231, and 241, the first regions 221a, 231a, and 241a differ in positional relations therebetween from the second regions 221b, 231b, and 241b. The first regions and the second regions have their positional relations adjusted such that in the respective protrusions 221, 231, and 241, the first regions 221a, 231a, and 241a do not correspond in position when the three optical sheets 22 to 24 are stacked in a prescribed location on the frame 28.

The first regions 221a, 231a, and 241a of the respective protrusions 221, 231, and 241 are not mounted on the frame 28. On the other hand, the second regions 221b, 231b, and 241b of the respective protrusions 221, 231, and 241 are mounted on the mounting portion of the frame 28 (portion where the second mounting surfaces 28b are formed by the step configuration). As can be seen from this configuration, gaps are formed between the peripheries of the respective optical sheets 22, 23, and 24 (in a scenario in which the protrusions are excluded) and the frame 28.

Figure 4:
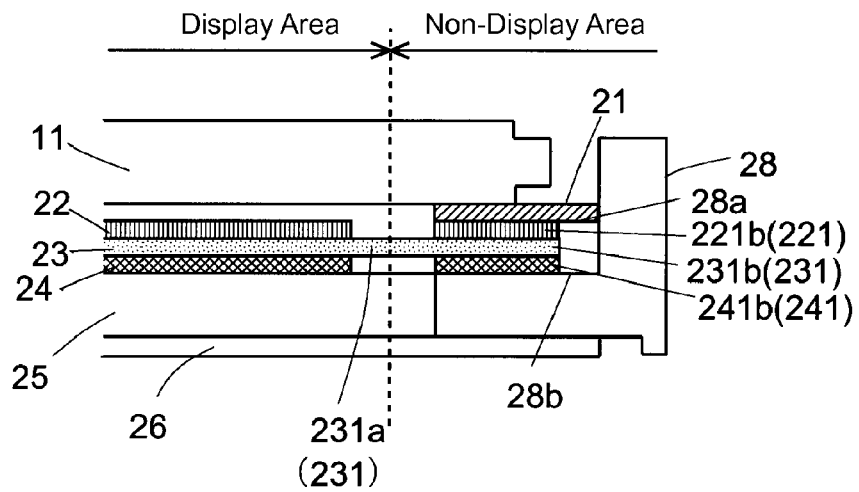
FIG. 4 is a schematic cross-sectional view along the line A-A of FIG. 2A.

FIG. 4 is a schematic cross-sectional view of FIG. 2A along the line A-A. In FIG. 4, the liquid crystal panel 11 is also shown for ease of understanding. The liquid crystal panel 11 is fixed in place by the light-shielding tape 21 (having double-sided adhesion). As shown in FIG. 4, the second regions 221b, 231b, and 241b of the protrusions 221, 231, and 241 mounted on the second mounting surface 28b overlap the adhesive tape 21. The light-shielding tape 21 is attached to the second region 221b of the protrusions 221.

As described above, the step between the first mounting surface 28a and the second mounting surface 28b of the frame 28 is substantially the same height (thickness) as the three optical sheets 22 to 24 stacked together. On the second mounting surface 28b, the second regions 221b, 231b, and 241b of the three protrusions 221, 231, and 241 (all having the same thickness as each of the optical sheets 22, 23, and 24) are stacked one on top of the other. Thus, the upper surface of the topmost protrusion 221 and the first mounting surface 28a are substantially in the same plane. As a result, when the light-shielding tape 21 is attached to the frame 28, the optical sheets 22 to 24 can be firmly fixed in place without any steps being formed.

Figure 5:
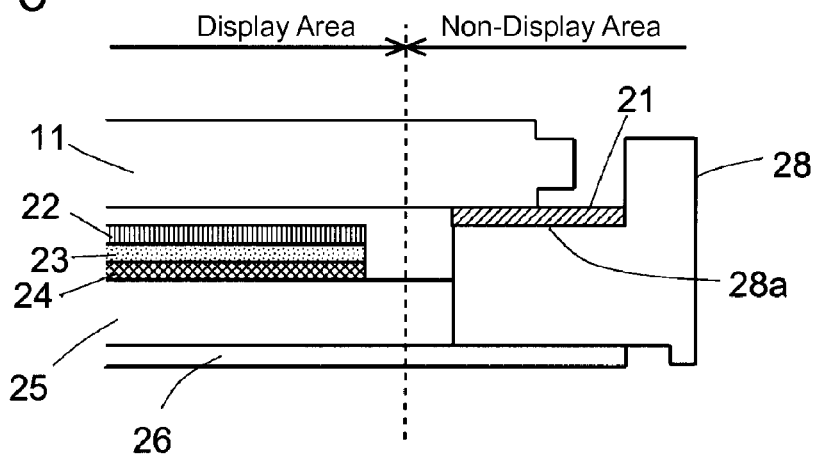
FIG. 5 is a schematic cross-sectional view along the line B-B of FIG. 2A.

Next, effects of the backlight device 2 of Embodiment 1 will be described with reference to FIGS. 4, 5, 17, and 18. FIG. 5 is a schematic cross-sectional view of FIG. 2A along the line B-B. In FIG. 5, the liquid crystal panel 11 is also shown for ease of description.

In the backlight device 2 of Embodiment 1 also, differences emerge in the state of the path of light emitted from the light guide plate 25 between portions where the protrusions 221, 231, and 241 are provided and portions where they are not provided in the vicinity of the boundary between the display area and non-display area ("vicinity" being defined as the area that affects display). However, due to the innovative configuration of the protrusions 221, 231, and 241 of the optical sheets 22 to 24, the state is different from the previously developed backlight device 200.

Figure 17:
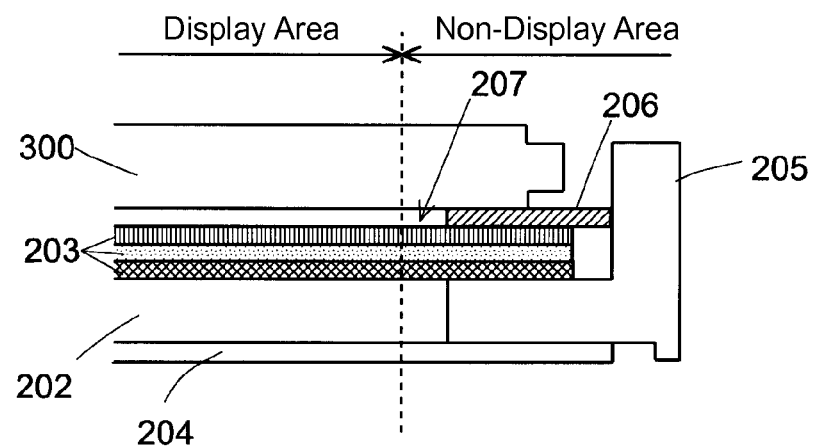
FIG. 17 is a schematic cross-sectional view along the line A'-A' of FIG. 16.
Figure 18:
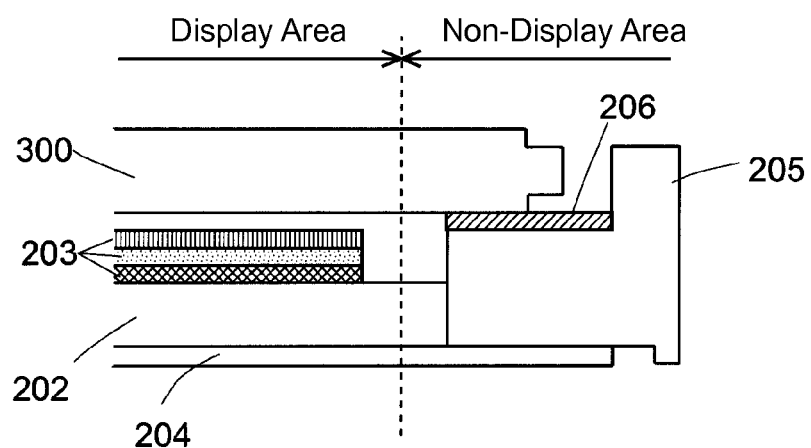
FIG. 18 is a schematic cross-sectional view along the line B'-B' of FIG. 16.

That is, in the previously developed backlight device 200, in areas where the protrusions 207 are provided, the light emitted from the light guide plate 202 needs to pass through the same number of optical sheets 203 as the number of optical sheets 203 provided in the backlight device 200 (three in the example shown in FIGS. 17 and 18). However, in the backlight device 2 of Embodiment 1, as shown in FIG. 4, in positions where the protrusions 221, 231, and 241 are provided, the light needs to pass through only one of the three optical sheets 22, 23, and 24.

As a result, in the backlight device 2 of Embodiment 1, the difference in transmittance between where protrusions are provided and where protrusions are not provided in the vicinity of the boundary between the display area and the non-display area is less than in the configuration of the previously developed backlight device 200. As a result, dark areas in the edge of the display area can be made less visible (it is possible to mitigate the occurrence of uneven brightness).

In the backlight device 2 of Embodiment 1, in the protrusions 221, 231, and 241, second regions 221b, 231b, and 241b provided on the tips thereof where the protrusions 221, 231, and 241 overlap each other are provided in addition to first regions 221a, 231a, and 241a provided in the bases of the protrusions where the protrusions 221, 231, and 241 do not overlap each other. As a result, when attaching the light-shielding tape 21 to the frame 28, there are no steps formed where the protrusions 221, 231, and 241 are provided, and a similar strength (adhesive strength of the light-shielding tape 21) to that of the previously developed backlight device 200 can be ensured.

In addition, when the backlight device 2 of Embodiment 1 is being assembled, it is possible to confirm the number of optical sheets visually, for example, with ease. Thus, when assembling the backlight device 2, it is possible to reduce the possibility of missing optical sheets.

In the description above, when disposing the three optical sheets 22, 23, and 24 in prescribed locations on the frame 28, among the stacked protrusions 221, 231, and 241, adjacent first regions (first region 221a and first region 231a, and first region 231a and first region 241a) are disposed without gaps therebetween. In this configuration, depending on the machining tolerance and assembly tolerance (tolerance for when the sheets are stacked) of the optical sheets 22 to 24, there is a possibility of the three first regions 221a, 231a, and 241a overlapping. Even if such an overlap occurs, there is no problem as long as such overlap is small.

Figure 6:
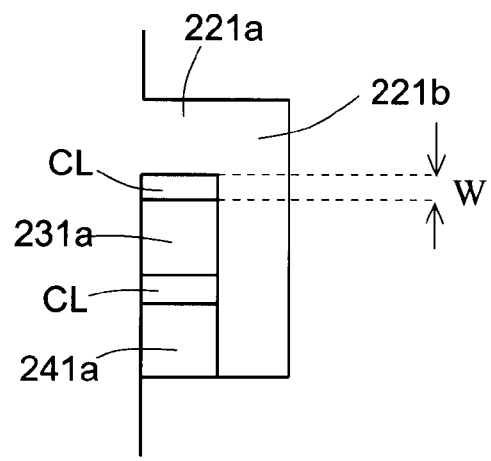
FIG. 6 is a drawing for describing Modification Example 1 of the backlight device of Embodiment 1.

In order to prevent such overlap between adjacent first regions resulting from the above-mentioned tolerances, a configuration of Modification Example 1 shown in FIG. 6 may be used. In the configuration of FIG. 6, gaps CL are provided between the first region 221a and the first region 231a, and between the first region 231a and the first region 241a (between adjacent regions).

In the example shown in FIG. 6, a width W of the gaps CL between the first region 221a and the first region 231a are respectively set at a machining tolerance±amm of the upper lens sheet 22, a machining tolerance±bmm of the lower lens sheet 23, and an assembly tolerance±cmm. In order for the first region 221a and the first region 231a not to overlap, the width W of the gap CL needs to be (a+b+c) mm. If a=b=c=0.2, for example, then the width W=0.6 mm.

Figure 7:
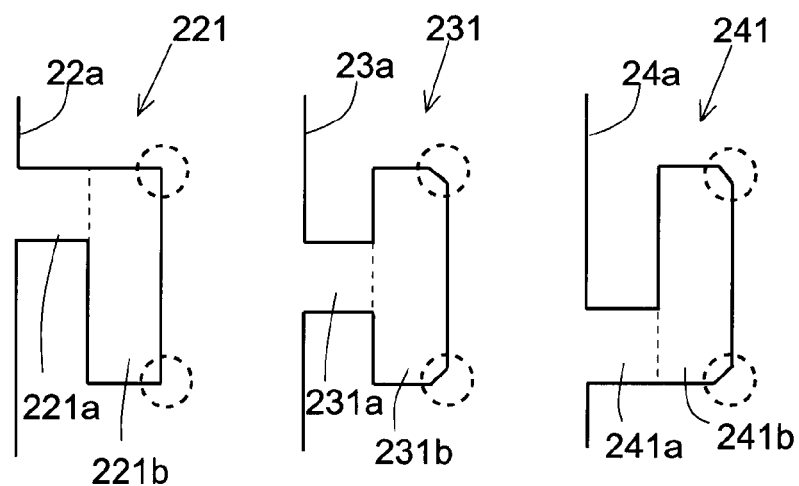
FIG. 7 is a drawing for describing Modification Example 2 of the backlight device of Embodiment 1.

Also, in the description above, the second regions 221b, 231b, and 241b that overlap other protrusions and that are provided on the tips of the three protrusions 221, 231, and 241 that are stacked together have exactly the same shape, and the second regions 221b, 231b, and 241b completely overlap each other. However, the present invention is not limited to this configuration. As shown in FIG. 7, for example, among the three protrusions 221, 231, and 241, two of the protrusions 231 and 241 may have the second regions 231b and 241b provided with chamfers, with the first region 221a of the remaining protrusion 221 not being provided with a chamfer (see dotted circles in the drawings) or the like. In other words, of the three stacked protrusions 221, 231, and 241, at least one of them may have a second region with a portion that does not overlap the second regions of the other protrusions.

Embodiment 2

Next, a liquid crystal display device of Embodiment 2 will be described. The configuration of the liquid crystal display device of Embodiment 2 is mostly the same as the liquid crystal display device 1 of Embodiment 1. Only the configuration of the protrusions included in the backlight device differs from that of Embodiment 1. Thus, only those portions will be described. Components that are the same as those in Embodiment 1 are assigned the same reference characters.

Figure 8:
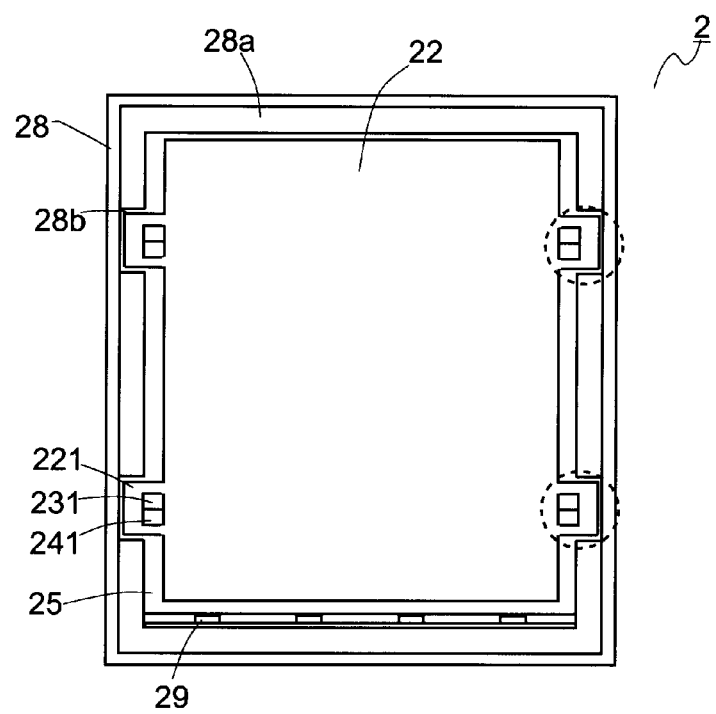
FIG. 8 is a schematic top view of a configuration of a backlight device of Embodiment 2.
Figure 9:
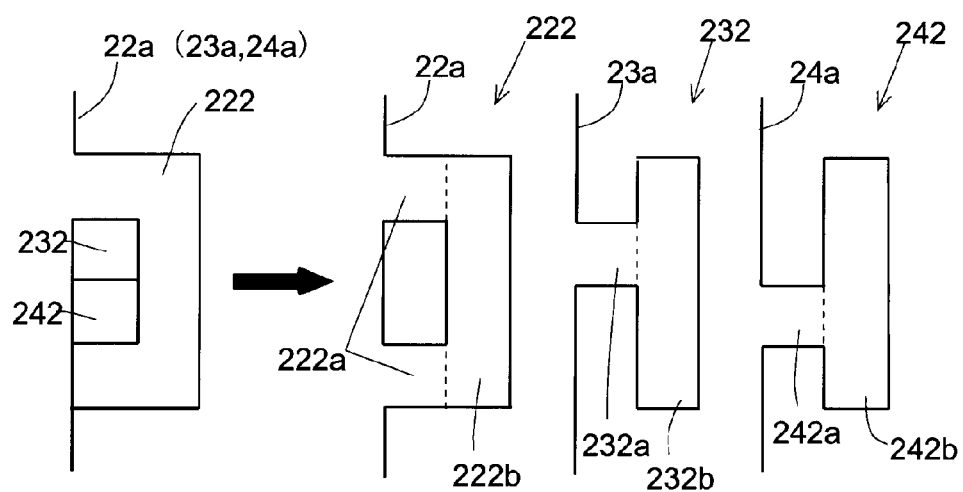
FIG. 9 is a schematic plan view for describing a configuration of protrusions included in the backlight device of Embodiment 2.

FIG. 8 is a schematic top view showing a configuration of the backlight device 2 of Embodiment 2. FIG. 8 corresponds to FIG. 2A showing the configuration of the backlight device 2 of Embodiment 1. FIG. 9 is a schematic plane view for describing the configuration of protrusions 222, 232, and 242 included in the backlight device 2 of Embodiment 2. FIG. 9 is a drawing for describing the configurations of the protrusions 222, 232, and 242 that are surrounded by the broken line circles in FIG. 8. In order to avoid redundant or similar descriptions to what was described in Embodiment 1, the protrusions surrounded by the broken line circles in FIG. 8 will be described as representative examples.

In FIG. 9, the left side of the thick arrow shows a state in which the three optical sheets 22 to 24 are disposed in a prescribed position in the frame 28 (same as the state shown in FIG. 8). Also, in FIG. 9, the right side of the thick arrow shows a state in which the protrusions 222, 232, and 242 of the three optical sheets 22 to 24 do not overlap. The right-side drawing is to clarify the difference in configuration of the protrusions 222, 232, and 242 formed in the optical sheets 22, 23, and 24.

The protrusion 222 extends in a direction substantially perpendicular to the long side 22a of the optical sheet 22 provided towards the base, and has two third belt-shaped portions 222a formed apart from each other, and a fourth belt-shaped portion 222b that extends in a direction substantially perpendicular to the two third belt-shaped portions 222a and connects the two third belt-shaped portions 222a. The regions constituted of the two third belt-shaped portions 222a correspond to first regions of the present invention, and the regions constituted of the two third belt-shaped portions are sometimes referred to below as the first regions. The region constituted of the fourth belt-shaped portion 222b corresponds to the second region of the present invention, and the region constituted of the fourth belt-shaped portion is sometimes referred to below as the second region.

On the other hand, the two protrusions 232 and 242 both have first belt-shaped portions 232a and 242a that are provided towards the base and that extend in a direction substantially perpendicular to the long sides 23a and 24a of the optical sheets 23 and 24, and second belt-shaped portions 232b and 242b that are provided towards the tips and that extend in a direction substantially perpendicular to the first belt-shaped portions 232a and 242a. However, the two protrusions 232 and 242 have different shapes from each other. The regions constituted of the first belt-shaped portions 232a and 242a correspond to the first regions of the present invention, and the regions constituted of the first belt-shaped portions are sometimes referred to below as the first regions. The regions constituted of the second belt-shaped portions 232b and 242b correspond to the second regions of the present invention, and the regions constituted of the second belt-shaped portions are sometimes referred to below as the second regions.

The second regions 222b, 232b, and 242b of the protrusions 222, 232, and 242 are the same shape (same size), all of which overlap when the three optical sheets 22 to 24 are stacked in a prescribed location on the frame 28. On the other hand, the first regions 222a, 232a, and 242a do not overlap when the three optical sheets 22 to 24 are stacked in the prescribed location on the frame 28. In other words, the opening provided in the first region 222a of the protrusion 222, the first region 232a of the protrusion 232 and the first region 242a of the protrusion 242 are disposed so as not to overlap each other.

The first regions 222a, 232a, and 242a of the protrusions 222, 232, and 242 are not mounted on the frame 28. On the other hand, the second regions 222b, 232b, and 242b of the protrusions 222, 232, and 242 are mounted on the mounting portion of the frame 28 (where a second mounting surface 28b is formed by the step structure). As can be seen from this configuration, gaps are formed between the peripheries of the respective optical sheets 22, 23, and 24 (in a scenario in which the protrusions are excluded) and the frame 28.

Even when protrusions 222, 232, and 242 are provided in the optical sheets 22, 23, and 24 as described above, effects similar to Embodiment 1 can be attained. In other words, it is possible to make dark areas in the edge of the display area of the liquid crystal display device 1 difficult to see. Also, when attaching the light-shielding tape 21 to the frame 28, no step is formed where the protrusions 222, 232, and 242 are provided, and thus, the optical sheets 22 to 24 are securely fixed in place. Also, when assembling the backlight device 2, it is possible to reduce the possibility of missing optical sheets. Besides these, it is possible to have the following effects by using Embodiment 2.

Figure 10:
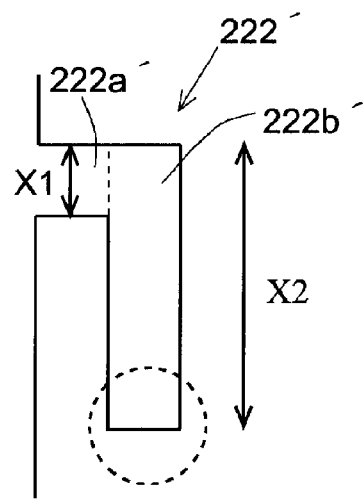
FIG. 10 shows effects of protrusions included in the backlight device of Embodiment 2.

FIG. 10 is a drawing for describing effects of the protrusions 222, 232, and 242 included in the backlight device 2 of Embodiment 2. A case in which a configuration similar to Embodiment 1 is used for a protrusion 222' included in an upper prism sheet 22 is assumed as an example. In such a case, if a length X2 in the up-and-down direction of the second region 222b becomes much larger than a length X1 in the up-and-down direction of a first region 222a', then one end portion (portion in the broken line circle) of a second region 222b' becomes susceptible to moving. If the configuration of the protrusion 222 as in Embodiment 2 is used, then the second region 222b is difficult to move, and thus, assembly becomes easier.

Even in Embodiment 2, a configuration may be used in which gaps CL are provided between adjacent first regions in the areas between the stacked protrusions 222, 232, and 242, as in Embodiment 1. Also, in the case of Embodiment 2, at least one of the three stacked protrusions 222, 232, and 242 may have a configuration in which a portion of the second region does not overlap the second regions of the other protrusions.

Embodiment 3

Next, a liquid crystal display device of Embodiment 3 will be described. The configuration of the liquid crystal display device of Embodiment 3 is mostly the same as the liquid crystal display device 1 of Embodiment 1. Only the configuration of the protrusions and the frame included in the backlight device differ from those of Embodiment 1. Thus, only those portions will be described. Components that are the same as those in Embodiment 1 are assigned the same reference characters.

Figure 11:
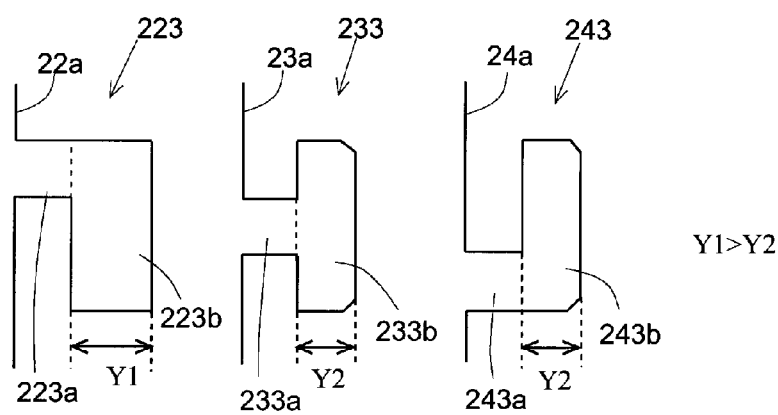
FIG. 11 is a schematic plan view for describing a configuration of protrusions included in the backlight device of Embodiment 3.

FIG. 11 is a schematic plan view for describing a configuration of protrusions 223, 233, and 243 included in a backlight device 2 of Embodiment 3. As shown in FIG. 11, the protrusions 223, 233, and 243 included in the backlight device 2 of Embodiment 3 are formed into a similar shape to that of Modification Example 2 of Embodiment 1 (this shape is one example and may be modified as appropriate). However, a length (Y1) in the protruding direction of a second region 223b of the protrusion 223 is greater than a length (Y2) in the same direction of second regions 233b and 243b of the other protrusions 233 and 243. In other words, in the backlight device 2 of Embodiment 3, among the stacked protrusions 223, 233, and 243, a protrusion with a different degree of protrusion from the edge of the optical sheets 22, 23, and 24 is present.

Figure 12:
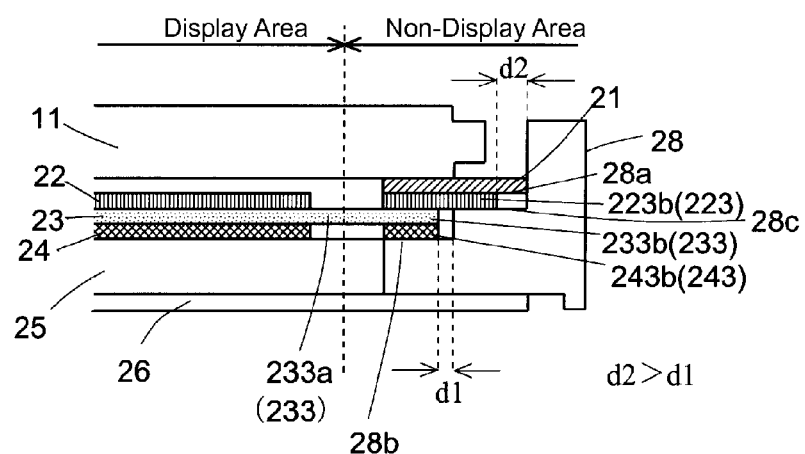
FIG. 12 is a cross-sectional view of a portion of a location where a protrusion is provided in the backlight device of Embodiment 3.
Figure 13:
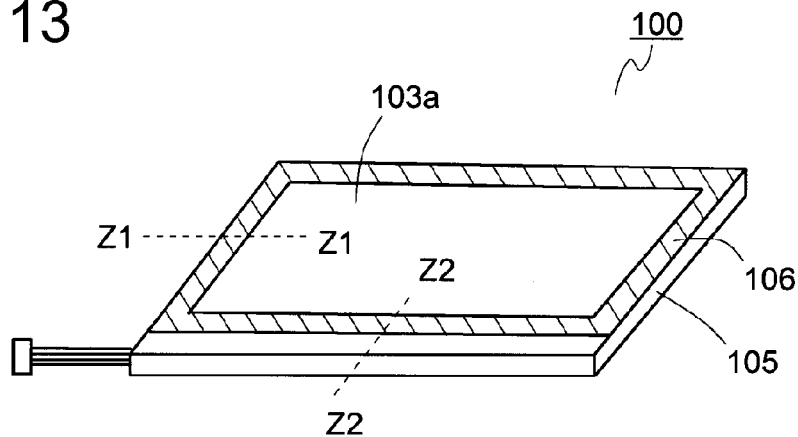
FIG. 13 is a schematic perspective view of a configuration example of a conventional backlight device.
Figure 14A:
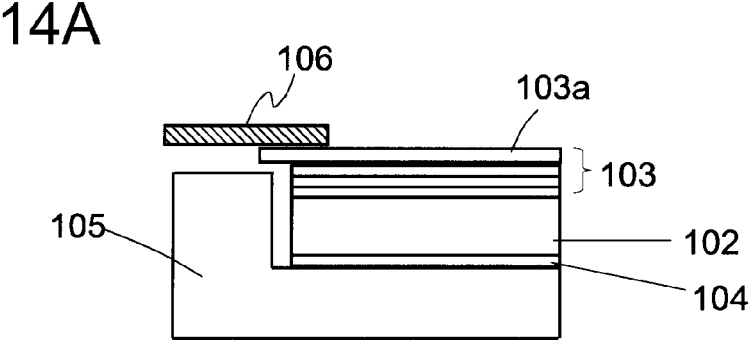
FIG. 14A is a schematic cross-sectional view of the backlight device shown in FIG. 13 along the line Z1-Z1.
Figure 14B:
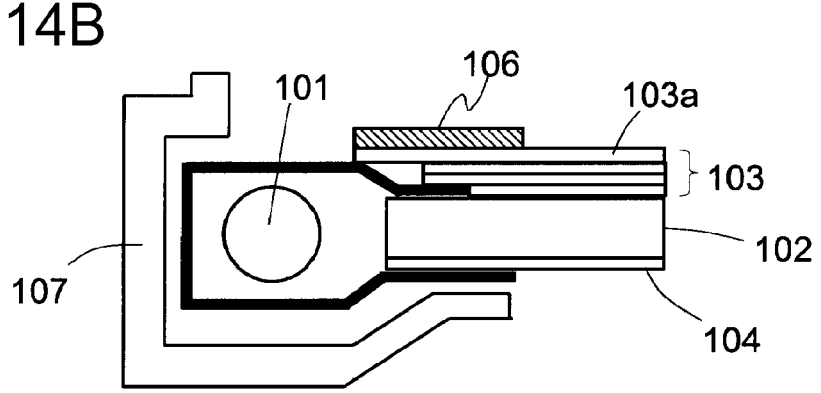
FIG. 14B is a schematic cross-sectional view of the backlight device shown in FIG. 13 along the line Z2-Z2.
Figure 15A:
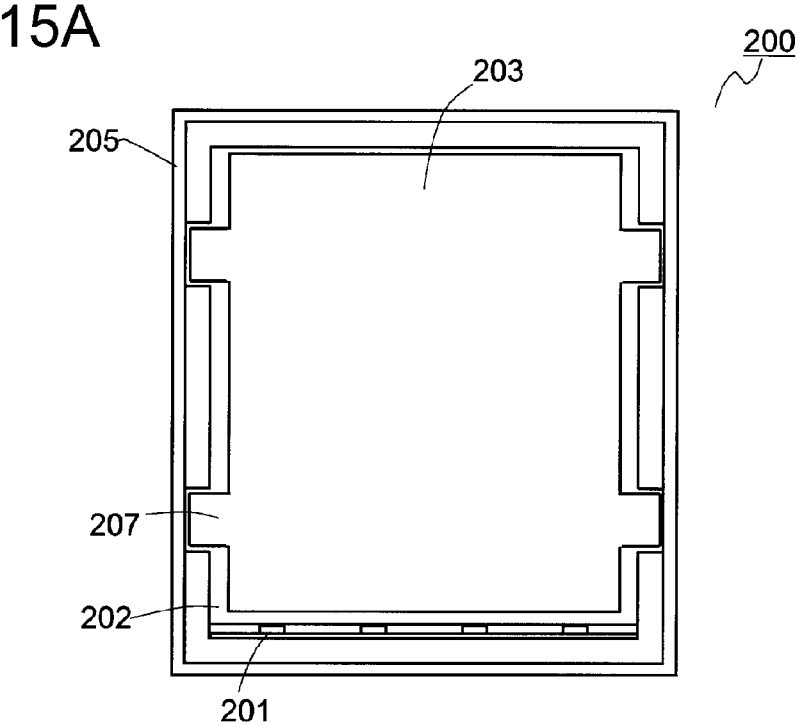
FIG. 15A is a top view of a configuration of a backlight device previously developed by the applicants of the present invention, prior to the light-shielding tape being attached.
Figure 15B:
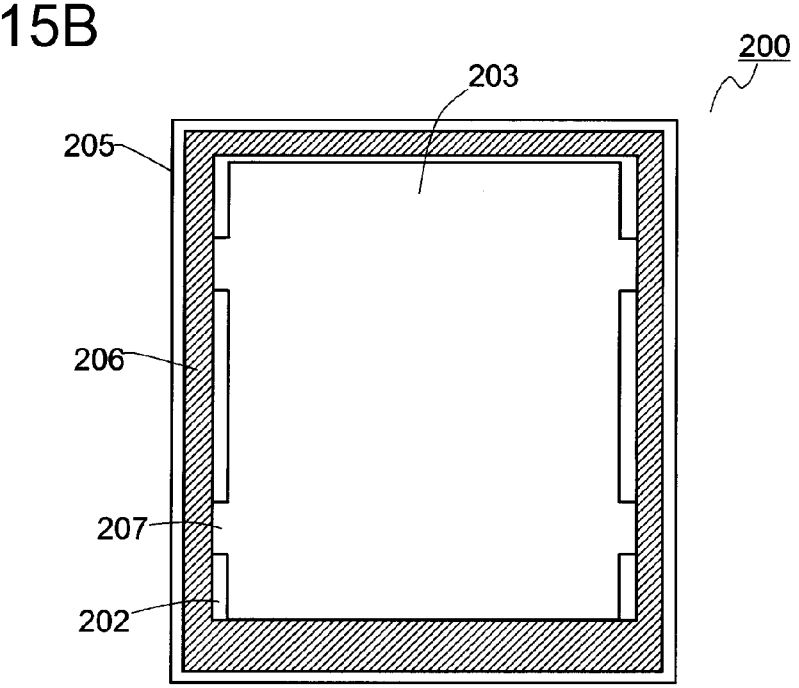
FIG. 15B is a top view of a configuration of a backlight device previously developed by the applicants of the present invention, after the light-shielding tape has been attached.
Figure 16:
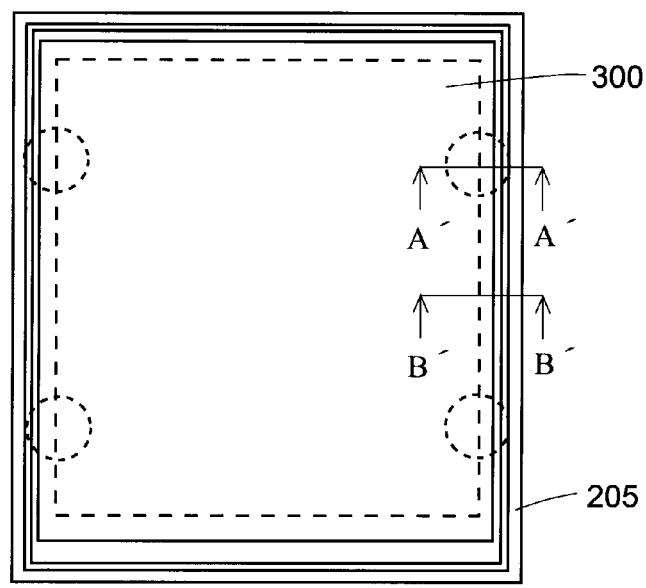
FIG. 16 is a schematic plan view showing a configuration of a display device in which a display panel is mounted on the backlight device of FIG. 15B.

As shown in FIG. 12, the configuration of the mounting portion of the frame 28 on which the protrusions 223, 233, and 243 are mounted so as to match the configuration of the protrusions 223, 233, and 243 differs from that of Embodiment 1. FIG. 12 is a partial cross-sectional view of a portion in the backlight device 2 of Embodiment 3 where the protrusions 223, 233, and 243 are provided. This cross-sectional view is similar to that of FIG. 4 used to describe Embodiment 1.

In Embodiment 1, the first mounting surface 28a on which the light-shielding tape 21 is mounted on the frame 28 and the second mounting surface 28b on which the stacked protrusions 221, 231, and 241 are mounted constituted a step configuration. In Embodiment 3, in the mounting portion where the stacked protrusions 223, 233, and 243 are mounted, a third mounting surface 28c that is higher than the second mounting surface 28b but lower than the first mounting surface 28a is additionally provided.

On the second mounting surface 28b, the three protrusions 223, 233, and 243 are mounted. On the other hand, on the third mounting surface 28c, only the topmost protrusion 233 among the three protrusions 223, 233, and 243 is mounted. The difference in height between the second mounting surface 28b and the third mounting surface 28c is substantially the same as the total thickness of the lower lens sheet 23 and the diffusion sheet 24 (protrusion 233 and protrusion 243). Also, the difference in height between the third mounting surface 28c and the first mounting surface 28a is substantially the same as the thickness of the upper lens sheet 22 (protrusion 223).

Effects similar to those of Embodiment 1 can also be attained with the configuration of Embodiment 3. Also, when using the configuration of Embodiment 3, when adjusting the position of the upper lens sheet 22, it is possible to prevent the other optical sheets 23 and 24 from also moving. In addition, the configuration of Embodiment 3 is suitable when, of the three optical sheets 22 to 24, for example, the topmost optical sheet 22 has a coefficient of expansion greater than the other optical sheets 23 and 24.

In other words, if providing the third mounting surface 28c on which only the topmost protrusion 233 of the three protrusions 223, 233, and 243 is mounted as in Embodiment 3, then the gap between the tips of the protrusions 223, 233, and 243 and the wall of the frame 28 can be modified with ease between the topmost protrusion 223 and the remaining two protrusions 233 and 243 (it is possible to perform this modification while mitigating a decrease in adhesive strength in the light-shielding tape 21). If a distance between the tip of the protrusion 223 and the wall of the frame 28 is d2 and a distance between the tips of the protrusions 233 and 243 and the wall of the frame 28 is d1, then d2>d1. As a result, when thermal expansion occurs, the tips of the protrusions 223 and 233 and the wall of the frame 28 are prevented from coming into contact with each other. In addition, when thermal expansion occurs, positional shift among the optical sheets 22 to 24 and warping in the optical sheets 22 to 24 can be prevented.

<Other>

The embodiments described above are merely examples of the present invention, and it is possible to modify appropriately the configurations of the embodiments without diverging from the technical scope of the present invention.

For example, in the embodiments above, the first regions of the protrusions in the optical sheets are not mounted on the frame while all of the respective second regions are mounted on the frame. However, as long as the optical sheets are held securely in place to a sufficient degree, then a portion of the first regions of the protrusions may be mounted on the frame, for example. Also, a portion of the second regions of the protrusions may protrude from the frame within a range that does not affect display, for example.

Also, in the embodiments above, the backlight device has a light guide plate. However, in some cases, the present invention can be applied to a so-called direct lit backlight device or the like in which a light guide plate is not used.

INDUSTRIAL APPLICABILITY

The present invention is suitable for a display device, such as a liquid crystal display device, including a backlight device, for example.

DESCRIPTION OF REFERENCE CHARACTERS 1 liquid crystal display device (display device)
2 backlight device
21 light-shielding tape
22 upper lens sheet (optical sheet)
23 lower lens sheet (optical sheet)
24 diffusion sheet (optical sheet)
25 light guide member
28 frame (frame member)
29 light source device
221, 222, 223 protrusion
221a, 223a first belt-shaped portion, first region
221b, 223b second belt-shaped portion, second region
222a third belt-shaped portion, first region
222b fourth belt-shaped portion, second region
231, 232, 233 protrusion
231a, 232a, 233a first belt-shaped portion, first region
231b, 232b, 233b second belt-shaped portion, second region
241, 242, 243 protrusion
241a, 242a, 243a first belt-shaped portion, first region
241b, 242b, 243b second belt-shaped portion, second region
CL gap

The invention claimed is:

1. A backlight device, comprising:
a light source;
a light guide plate that receives light emitted by the light source and outputs light upward from a top surface of the light guide;
a plurality of stacked optical sheets over the light guide, receiving the light outputted from the light guide plate, each of the optical sheets having a planar shape; and
a frame member that fixes the plurality of optical sheets in place,
wherein each of the plurality of optical sheets is provided with a protrusion in a portion of an edge of each of the optical sheets, the protrusion protruding out from one side of the optical sheet in a direction parallel to a surface of each of the optical sheets,
wherein the protrusion provided in each of the plurality of optical sheets has:
a first region that is directly connected to each of the optical sheets and that does not overlap a protrusion of another optical sheet; and
a second region that is connected to each of the optical sheets through the first region and that overlaps the protrusion of said another optical sheet at least in part, and
wherein at least a portion of the first region is not mounted on the frame member, and at least a portion of the second region is mounted on the frame member.

2. The backlight device according to claim 1, further comprising a light-shielding tape that fixes said protrusions to the frame member,
wherein the frame member has recesses in portions thereof where the protrusions are to be disposed such that the height of the light-shielding tape is the same in both portions where the protrusions are disposed and portions where the protrusions are not disposed.

3. The backlight device according to claim 1, wherein a plurality of said protrusions are provided with a gap in a plan view between adjacent said first regions.

4. The backlight device according to claim 1, wherein, among the plurality of protrusions, a protrusion differs in amount of protrusion from the edge of the optical sheet compared to other protrusions.

5. The backlight device according to claim 1, wherein, in all of the plurality of optical sheets, the protrusions respectively have first belt-shaped portions that are said first regions, and second belt-shaped portions that are said second regions and that extend in a direction substantially perpendicular to the first belt-shaped portions.

6. The backlight device according to claim 1,
wherein the protrusions formed in the plurality of optical sheets include:
a first type having first belt-shaped portions that are the first regions and second belt-shaped portions that are the second regions and that extend in a direction substantially perpendicular to the first belt-shaped portions; and
a second type each having two third belt-shaped portions that are disposed with a gap therebetween and that are the first regions, and a fourth belt-shaped portion that connects ends of the two third belt-shaped portions and that is the second region.

7. A display device, comprising:
the backlight device according to claim 1; and
a display panel illuminated by light from the backlight device.

8. The display device according to claim 7, wherein a boundary between a display region and a non-display region in the display panel is positioned over the first regions of the protrusions.

* * * * *